(12) United States Patent
Wilds et al.

(10) Patent No.: US 8,590,798 B2
(45) Date of Patent: Nov. 26, 2013

(54) SECURE AUTHENTICATION FEATURE

(75) Inventors: Mark Wilds, Cambridge (GB); Peter Kelly, Cambridge (GB); Paul Roberts, Cambridge (GB); Dan Timson, Cambridge (GB)

(73) Assignee: ITI Scotland Limited, Glasgow (GB)

( * ) Notice: Subject to any disclaimer, the term of this patent is extended or adjusted under 35 U.S.C. 154(b) by 260 days.

(21) Appl. No.: 12/670,609

(22) PCT Filed: Jul. 25, 2008

(86) PCT No.: PCT/GB2008/002549
§ 371 (c)(1),
(2), (4) Date: Apr. 28, 2011

(87) PCT Pub. No.: WO2009/013510
PCT Pub. Date: Jan. 29, 2009

(65) Prior Publication Data
US 2011/0192906 A1    Aug. 11, 2011

(30) Foreign Application Priority Data
Jul. 26, 2007    (GB) .................................. 0714534.5

(51) Int. Cl.
*G06K 19/06*    (2006.01)
(52) U.S. Cl.
USPC ........................................................ 235/494
(58) Field of Classification Search
USPC ................................................. 235/468, 494
See application file for complete search history.

(56) References Cited

U.S. PATENT DOCUMENTS

| 6,115,508 A | 9/2000 | Lopresti et al. |
|---|---|---|
| 2003/0035131 A1 | 2/2003 | Dukler et al. |
| 2005/0087606 A1 | 4/2005 | McCumber |
| 2005/0092844 A1 | 5/2005 | Zhang et al. |
| 2011/0049250 A1* | 3/2011 | Hovis et al. .................. 235/494 |

FOREIGN PATENT DOCUMENTS

| EP | 0988150 | 5/1998 |
|---|---|---|
| EP | 0907139 A2 | 4/1999 |
| EP | 1176543 A1 | 1/2002 |
| EP | 1196297 | 4/2002 |
| EP | 1610263 | 12/2005 |
| GB | 2366645 A | 3/2002 |
| KR | 200296764 A | 12/2002 |
| WO | WO93/07006 A1 | 4/1993 |
| WO | WO98/22291 | 5/1998 |

OTHER PUBLICATIONS

UK IPO Search Report for GB0714534.5 dated Nov. 19, 2007.
International Search Report for PCT/GB2008/002549, dated Oct. 23, 2008.

* cited by examiner

*Primary Examiner* — Daniel Hess
(74) *Attorney, Agent, or Firm* — W. Kevin Ransom; Moore & Van Allen PLLC

(57) ABSTRACT

A security tag comprising at least one overt data carrier (10), and at least one covert data carrier (25), the covert data carrier comprising a ring (25) that is formed around the overt data carrier (10). The covert data carrier (25) is invisible to the unaided eye when lit with visible light, but visible when illuminated with other light, for example UV light.

20 Claims, 1 Drawing Sheet

SECURE AUTHENTICATION FEATURE

FIELD OF THE INVENTION

The present invention relates to a secure authentication feature and in particular a secure authentication features for use in a brand protection system.

BACKGROUND

With brand loyalty becoming increasingly important in adding value and differentiating goods in the market place, it is important for brand owners to monitor the authenticity and use of their products. To this end, covert security features are frequently applied to goods to authenticate that they are genuine. Examples of covert security features include markings in ink that is invisible in visible light but fluoresces under UV light, as described in EP 01 196 297 and GB 2 366 645. Similar features are known that employ IR sensitive inks rather than UV sensitive inks, as described in EP 00 988 150.

Security may be improved by providing multiple security features. US 2005/0 092 844 describes an information card having a multitude of security features such as magnetic strips, RF-ID tags, integrated circuits and composite barcodes. Further security may be added by providing a relationship between two security features such that both security features need to be read to provide the security information. Examples of this are described in EP 01 610 263.

As counterfeiters become adept at detecting and copying covert security features, new security features are required.

SUMMARY OF THE INVENTION

According to a first aspect of the present invention, there is provided a tag comprising at least one overt data carrier pattern and at least one covert data carrier pattern located at an external periphery of the overt data carrier pattern.

Locating the covert data carrier pattern at an external periphery of the overt data pattern allows the covert data carrier pattern to be located more easily.

The overt and/or covert data carrier patterns may be machine readable.

The covert data carrier pattern may be spaced apart from the overt data carrier pattern. Alternatively, the covert data carrier may abut the overt carrier. In this way, both the overt and covert data carriers can be read in one operation, saving scanning time.

The covert data carrier pattern may surround the overt data carrier pattern. For example, the covert data carrier pattern may form a ring around the overt data carrier pattern. By being located externally and in the area surrounding the overt data carrier pattern, scaling the overt data carrier pattern by increasing or decreasing its size will result in a similar scaling of the covert data carrier pattern surrounding it. Therefore, the covert data pattern will have increased capacity required to encode or authenticate the increased capacity of the overt data carrier pattern.

The covert data carrier pattern may be located in an exclusion zone around the overt data carrier pattern. By locating the covert data carrier pattern in the exclusion zone around the overt data carrier pattern, the overt data carrier pattern appears unchanged in ambient lighting conditions and any packaging to which the tag is applied can also remain unchanged.

The overt and covert data carrier patterns may be the same type of data carrier pattern. The overt and/or covert data carrier patterns may be barcodes. By employing the same type of data carrier pattern, e.g. barcodes, for both the overt and covert security feature, minimal alterations to existing reader configurations are required. Indeed, the overt data carrier pattern may be readable and writable in exactly the same way as a conventional data carrier pattern. The security of the system is further increased as the reader used for the authentication of both overt and covert data carrier patterns can outwardly look the same as a conventional tag reader.

The covert data carrier pattern may be aligned with the overt data carrier pattern. By aligning the covert data carrier pattern with the overt data carrier pattern, alignment and/or orientation markings of the overt data carrier pattern may be used to determine the alignment and/or orientation of the covert data carrier pattern. In this way, the covert data carrier pattern need not contain any alignment and/or orientation markings, allowing the useable data held by the covert carrier to be maximised and/or the space taken by the covert data carrier pattern minimised.

The covert data carrier pattern may be arranged to authenticate the overt carrier pattern. This allows the tag to be authenticated off-line.

The covert data carrier pattern may be defined using UV or IR fluorescing ink.

The overt data carrier pattern may contain encrypted data. The covert data carrier pattern may contain a key to decrypt the data in the overt data carrier pattern.

The covert data carrier pattern may be adapted to store at least 128 data bits.

The covert and/or overt data carrier pattern may partially contain error correction information. The error correction information may comprise at least 10% and preferably at least 40% of the data stored on one or more of the data carrier patterns. The error correction information may use Reed-Solomon and convolutional encoding.

The covert data carrier may be invisible to the unaided eye when lit with visible light, but visible when illuminated with other light. The covert data carrier may be visible under UV or IR illumination.

The covert data carrier pattern may comprise two or more covert data carrier patterns. At least one of the covert data carrier patterns may be adapted to be visible under illumination of radiation at a different frequency to that of at least one other covert data carrier pattern.

The covert data carrier pattern may be linear, which in practice may be easier to fit within the exclusion zone around the overt data carrier pattern.

The covert data carrier pattern may be a two-dimensional bar code. An advantage of this is that it has an increased data storage capacity.

The covert data carrier pattern may contain a hash of at least part of the data in the overt data carrier pattern. The hash may be an MD5 digest.

According to another aspect of the invention, there is provided a tag reader adapted to read a tag comprising at least one overt data carrier pattern and at least one covert data carrier pattern located at the external periphery of the overt data carrier pattern.

The tag reader may be provided with a visual light source and a UV and/or IR light source.

The tag reader may contain a secure access module (SAM) for secure processing and storage of tag related data.

BRIEF DESCRIPTION OF THE DRAWINGS

The present invention will be described by way of example only with reference to the following drawings, of which.

DETAILED DESCRIPTION OF THE DRAWINGS

Figure 1:
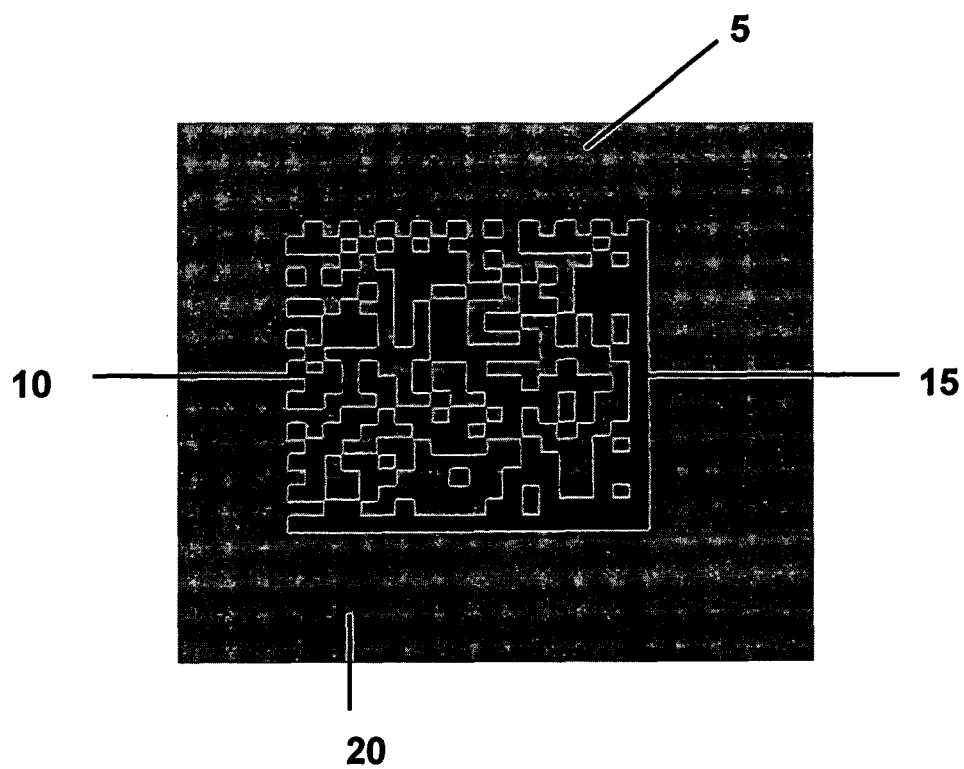
FIG. 1 shows an image of the secure authentication feature of the present invention when lit with a visible light source.

FIG. 1 shows a tag 5 illuminated under visible light. The tag 5 comprises an overt two-dimensional bar code 10, which in this case is a 20×20 ECC 200 datamatrix barcode. The barcode 10 is made up of a grid of components that are either light or dark and are read in two dimensions. Combinations of light and dark components are interpreted according to a protocol into alphanumeric characters.

The barcode 10 has alignment and configuration features 15, which in this case include two solid lines extending perpendicularly from each other along two edges of the barcode 10 and two broken lines of alternating light and dark pixels extending along the other two edges of the barcode 10. These alignment and configuration features 15 do not carry data. The solid lines are used to locate, align and orient the barcode 10 whilst the broken lines are used to determine the number and size of the components in the barcode 10. The tag 5 further comprises a blank exclusion zone 20 surrounding the barcode 10. The barcode 10 is of a standard specification and can be read by a conventional barcode reader.

Figure 2:
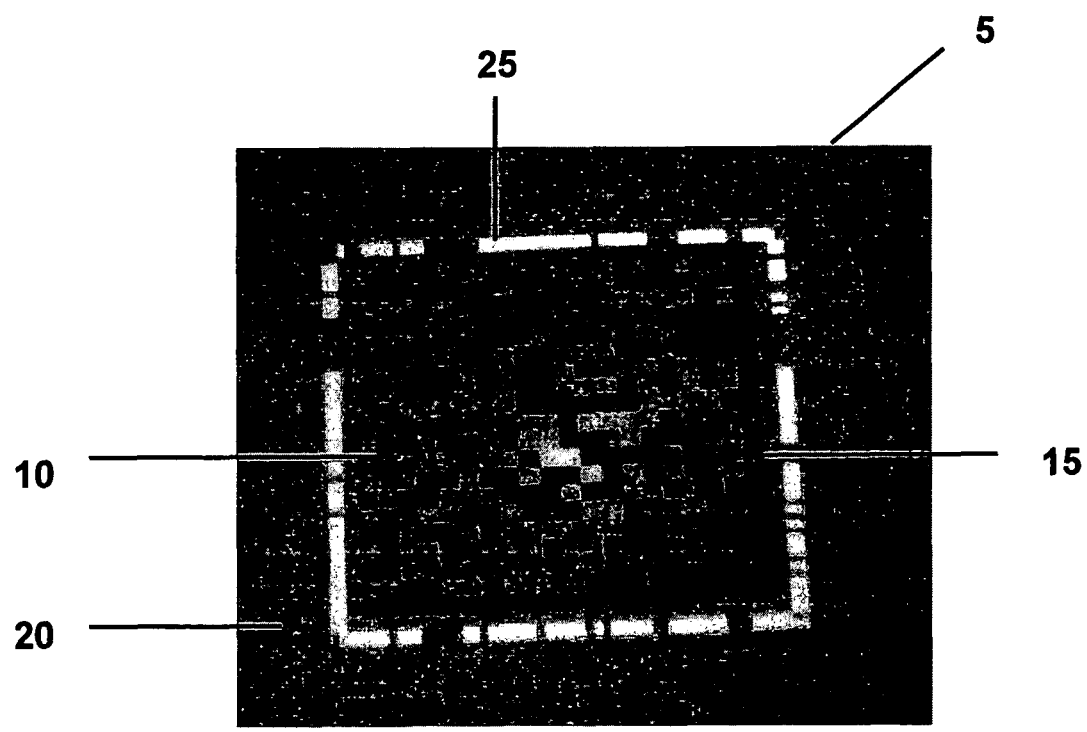
FIG. 2 shows an image of the secure authentication feature of FIG. 1 when lit with both a visible and a UV light source.

The tag 5 is further provided with a covert linear data carrier 25 in a ring located in the exclusion zone 20 around the periphery of the overt two-dimensional barcode 10. The covert data carrier 25 is invisible to the unaided eye when lit with visible light, but visible when illuminated with other light, for example UV light. The covert linear data carrier 25 is printed in UV fluorescent ink that is invisible to the eye and to conventional barcode readers when lit only with visible light, as shown in FIG. 1, but visible when illuminated with UV light, as shown in FIG. 2.

The covert linear data carrier 25 is composed of fluorescing and non-fluorescing components that are similarly sized and dimensioned to the light and dark components of the overt barcode 10. The components of the covert linear data carrier 25 are aligned and oriented with the components of the overt barcode 10 such that the alignment and configuration features 15 of the overt barcode 10 can be used to determine the alignment and orientation of the covert data carrier 25. Similarly, by defining a relationship between the number and size of pixels in the covert barcode and the overt barcode, the number and size of pixels in the covert data carrier 25 can be determined from the alignment and configuration features 15 of the overt barcode 10.

Using the 20×20 ECC 200 datamatrix barcode 10 and covert linear data carrier 25 as described above, it is possible to store 224 bits of data in the covert data carrier 25. The data stored by the covert data carrier 25 contains error correction data in order to decrease the likelihood of erroneous decoding, which is typically at least 10% and preferably 40% of the total covert data. The error correction used is Reed-Solomon and convolution encoding.

In an alternate embodiment, the tag 5 comprises multiple covert data carriers 25 superimposed with each other. Each covert data carrier 25 is arranged to fluoresce at a different wavelength and/or different intensity such that they can be distinguished. In a further alternate embodiment, the covert data carrier may be a 2D data carrier ring, analogous to a 2D barcode.

The covert data carrier 25 is adapted to hold data that is usable in the authentication of the overt barcode 10. In this way, entanglement of data on the overt data carrier 10 with the data on the covert data carrier 25 may be achieved, resulting in a data set that is more difficult for counterfeiters to extract than a data set on a single carrier. In one embodiment, the covert data carrier 25 contains a key for decrypting data encrypted in the overt barcode 10.

In an alternate or additional embodiment, the covert data carrier 25 contains a hash of the data in the overt barcode 10 or a message authentication code (MAC) for use in authenticating the overt barcode 10 data. An appropriate hash function may be selected depending on the size of the barcode 10 and the amount of data carried, for example, in the tag 5 given above, an MD5 function is a preferred as this would require a digest of 128 bits which is ideally sized for storing on the covert data carrier 25.

Both the covert data carrier 25 and the barcode 10 can be applied using conventional barcode manufacturing processes. For example, if the overt barcode 10 is applied using an inkjet printer, then an ink compartment in the inkjet printer may be filled with ink that is UV or IR fluorescing, but colourless under visible light, for printing the covert data carrier 25.

Standard 2D barcode readers consist of an imager and a source of illumination (typically red LEDs). If some of the red LEDs were replaced or augmented with UV or IR LEDs then the imager could simultaneously capture both the overt barcode 10 and the covert data carrier 25. Optimal imaging of the covert data carrier 25 relative to the overt barcode 10 can be achieved by changing their relative contrasts, which can be done by varying the relative intensities of the red and UV/IR LEDs. Alternatively, sequential images could be taken, the first image being illuminated using red LEDs and the subsequent image illuminated with UV or IR LEDs. The interval between sequential image captures is made sufficiently short so that measurement appears effectively simultaneous to a user. When using IR LEDs, standard imager hardware could be used, as most CCD and CMOS imagers are sensitive to IR light as well as visible radiation. To ensure data security, a secure processing module such as a secure access module (SAM) can be embedded into the barcode reader for secure processing and storage of tag related data.

The data carrier patterns 5 described above are applicable to a wide range of items or resources or their associated packaging and provide both data associated with, and authentication of, the item or resource. In this way, the above tags 5 are advantageously suitable for use on packages of high value or safety critical goods, such as pharmaceuticals or aircraft components. The quick, cheap and easy machine readable nature of the above tags 5 and readers make them beneficial for use in systems such as track and trace or brand protection management systems.

A skilled person will appreciate that variations of the disclosed arrangements are possible without departing from the scope of the invention. For example, although the overt data carrier pattern 10 has been described as a two dimensional barcode, other suitable data carrier patterns such as one-dimensional barcodes may be used. Furthermore, whilst the covert data carrier pattern 25 has been described as being printed in UV or IR active inks, inks that are active in other spectroscopic regions or other covert inks or marking materials such as magnetically active inks may be used.

Although the covert data and the overt data have been described as being related by hash function, MAC or key encryption, in practice, any suitable form of data entanglement between the overt 10 and covert 25 data carrier such as partitioning data between data carriers 10, 25 may be used. Similarly, a person skilled in the art would realise that suitable variations or alternatives to the examples of hash function, MAC or key encryption described above may be used. Accordingly the above description of the specific embodiment is made by way of example only and not for the purposes of limitations. It will be clear to the skilled person that minor modifications may be made without significant changes to the operation described.

The invention claimed is:

1. A tag comprising:
at least one machine-readable overt data carrier;
a blank exclusion zone surrounding the machine-readable overt data carrier, wherein said blank exclusion zone is absent of visible indicia; and
at least one machine-readable covert data carrier that includes information to authenticate the machine-readable overt data carrier,
wherein the machine-readable covert data carrier is located in the blank exclusion zone and forms a ring around the machine-readable overt data carrier, and
wherein the machine-readable covert data carrier is invisible to an unaided eye.

2. A tag as claimed in claim 1, wherein the covert data carrier surrounds the overt data carrier.

3. A tag as claimed in claim 2, wherein the covert data carrier forms a ring around the overt data carrier.

4. A tag as claimed in claim 1, wherein the covert data carrier is aligned with the overt data carrier.

5. A tag as claimed in claim 1, wherein the overt and/or covert data carriers are machine-readable.

6. A tag as claimed in claim 1, wherein the covert data carrier is spaced apart from the overt data carrier.

7. A tag as claimed in claim 1, wherein the covert data carrier abuts the overt data carrier.

8. A tag as claimed in claim 1, wherein the overt and covert data carriers are the same type of data carrier.

9. A tag as claimed in claim 1, wherein the overt and/or the covert data carrier comprise a barcode.

10. A tag as claimed in claim 1, wherein the covert data carrier includes information to authenticate the overt carrier.

11. A tag as claimed in claim 1, wherein the overt data carrier contains encrypted data.

12. A tag as claimed in claim 11, wherein the covert data carrier contains a key to decrypt the data in the overt data carrier.

13. A tag as claimed in claim 1, wherein the covert data carrier is adapted to store at least 128 data bits.

14. A tag as claimed in claim 1, wherein the covert and/or overt data carrier at least partially contain error correction information.

15. A tag as claimed in claim 14, wherein the error correction information comprises at least 10% and preferably at least 40% of the data stored on one or more of the data carriers.

16. A tag as claimed in claim 1, wherein the covert data carrier comprises two or more covert data carriers.

17. A tag as claimed in claim 1, wherein the covert data carrier is linear.

18. A tag as claimed in claim 1, wherein the covert data carrier contains a hash of at least part of the data in the overt data carrier.

19. A tag reader adapted to read a tag, said tag reader: configured to read a tag comprising:
at least one machine-readable overt data carrier;
a blank exclusion zone surrounding the machine-readable overt data carrier, wherein said blank exclusion zone is absent of visible indicia; and
at least one machine-readable covert data carrier comprising information to authenticate the machine-readable overt data carrier, wherein the covert data carrier is located in the blank exclusion zone, forms a ring around the overt data carrier, and is invisible to an unaided eye and said tag reader further comprising a visible light source and a UV or IR light source.

20. A tag reader according to claim 19 including a SAM for secure processing and storage of tag related data.

* * * * *